United States Patent [19]

Ogle

[11] 4,306,158

[45] Dec. 15, 1981

[54] BATTERY SAVER HEADLIGHT SWITCH

[76] Inventor: David W. Ogle, 12118 Cyrus Rd., Lynnwood, Wash. 98036

[21] Appl. No.: 63,249

[22] Filed: Aug. 2, 1979

[51] Int. Cl.³ .............................................. B60Q 1/04
[52] U.S. Cl. ................................ 307/10 LS; 307/118; 315/82
[58] Field of Search ............ 307/10 LS, 118; 315/82, 315/83; 339/154 R, 154 A, 155 R, 156 R; 340/74

[56] References Cited

U.S. PATENT DOCUMENTS

| | | | |
|---|---|---|---|
| 3,039,020 | 6/1962 | Sargent | 315/82 |
| 3,058,030 | 10/1962 | Simpkins | 315/82 |
| 3,125,702 | 3/1964 | Herridge et al. | 200/16 C X |
| 3,137,448 | 6/1964 | Holzhause | 339/154 A |
| 3,369,147 | 2/1968 | Ramsey | 307/10 LS X |
| 3,774,071 | 11/1973 | Goodrich | 315/82 |
| 4,097,778 | 6/1978 | Ludwig | 315/82 |

*Primary Examiner*—George H. Miller, Jr.
*Assistant Examiner*—James L. Dwyer
*Attorney, Agent, or Firm*—Hughes, Barnard & Cassidy

[57] ABSTRACT

An automatic headlight extinguishing switch apparatus especially adapted to interfit with an existing automobile light switch member which comprises a switch means and a wiring harness. The headlight extinguishing switch apparatus comprises an adapter apparatus which interfits between the switch means and the wiring harness, and a normally open pressure sensitive switch device which is operatively connected to the adapter apparatus. The pressure sensitive switch device is adapted to be connected to an automobile vacuum line or an automobile pressurized oil line, such that the switch will be closed when the engine is turned on and will open when the engine is turned off. A manually operable override switch member is provided which bypasses the pressure sensitive switch device and permits the automobile lights to be operated when the engine is turned off.

5 Claims, 5 Drawing Figures

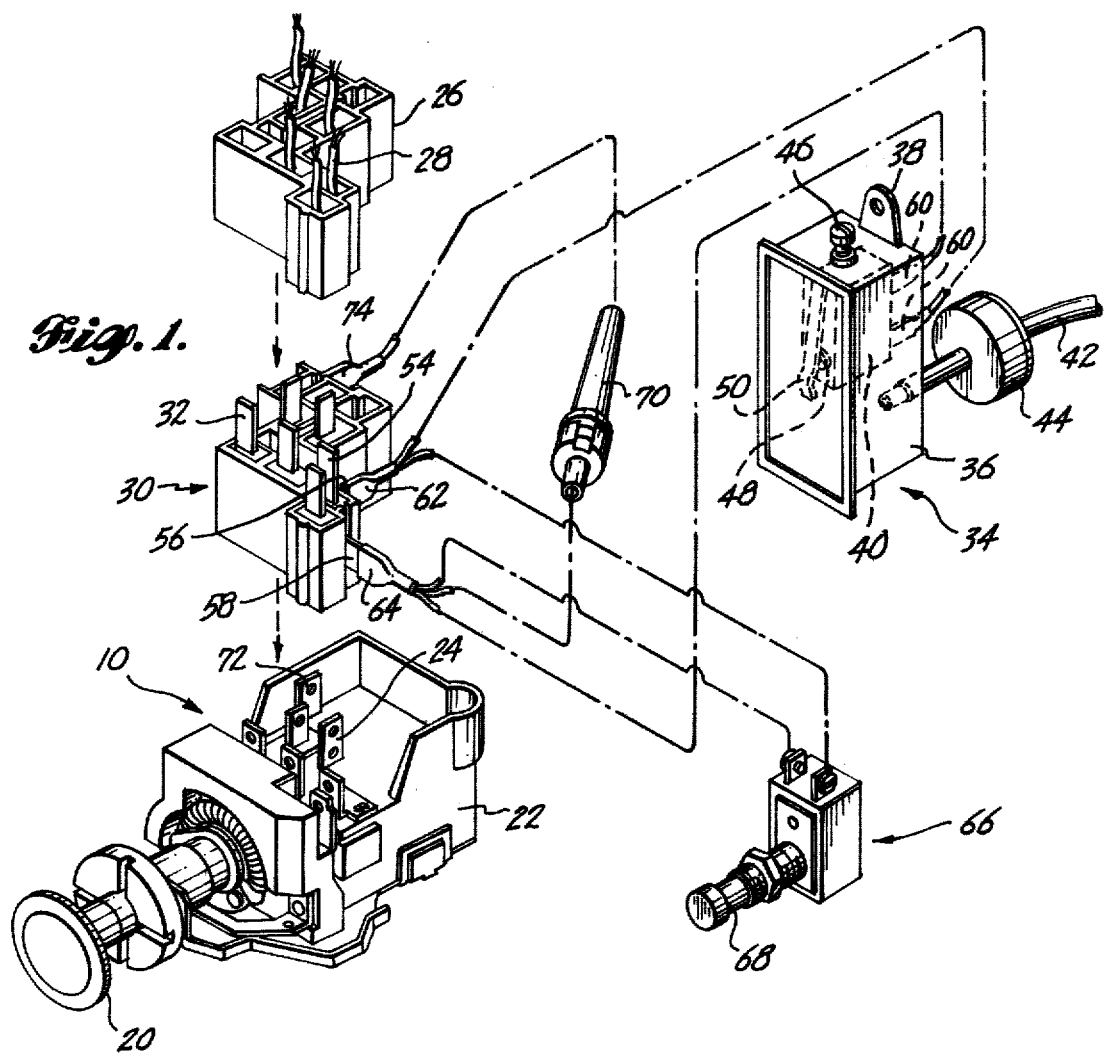
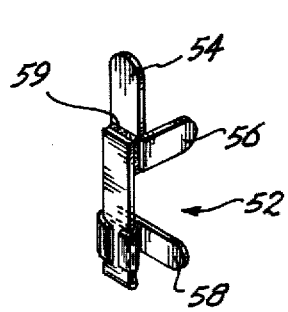
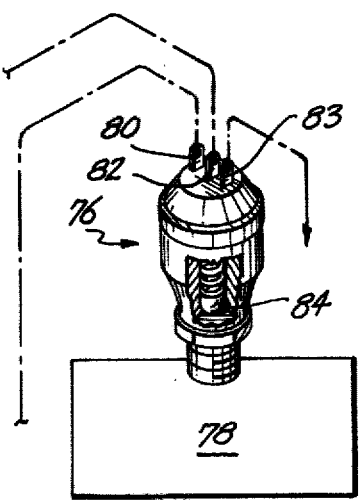

BATTERY SAVER HEADLIGHT SWITCH

BACKGROUND OF THE INVENTION

It has been found that an automobile travelling during daylight hours is much more readily visible to oncoming traffic if the headlights are turned on. However, upon stopping the automobile and turning the engine off, it is relatively easy to forget to turn off the headlights since they are not shining brightly against objects in front of the automobile. Additionally, during periods of fog or immediately preceding sunrise, one may wish to travel with the headlights on for safety purposes, but forget to turn them off upon reaching the destination. In these cases, if the driver is away from the automobile for any appreciable period of time, with the headlights burning, it is not uncommon for the battery to be dead and therefore one is unable to start the car upon returning. This can result in minor inconvenience and/or expense if aid is close, but may be extremely costly and time consuming if help must be summoned from a great distance.

Consequently, various methods for automatically turning off the headlights of motor vehicles have been proposed in the past, running the gamut from completely turning off the electrical system so that none of the lights or other electrically operated automobile accessories may function, to complex switching devices designed just to turn off the headlights.

U.S. Pat. No. 3,706,006, Miller, illustrates a lighting control device wherein a relay is connected in parallel with the conventional lighting system switch, so that when the engine is started a lighting switch responsive to the vehicle's generator energizes the relay, causing the parallel-connected contacts to turn the vehicle's lighting system on regardless of the position of the manually operated light switch. A further illustration of the prior light switch devices is U.S. Pat. No. 3,125,702, Herridge, Jr. et al, wherein a vacuum motor having a moveable diaphragm engages a manually operable switch shaft when the engine is running to maintain the headlights in an on position, and when the engine is turned off releasing the vacuum, the vacuum motor device releases the switch shaft, thereby turning off the lights. The vacuum motor may be manually overridden to operate the vehicle lights when the engine is not running. Similarly, U.S. Pat. No. 3,039,020, Sargent, discloses a switch wherein a shaft is manually disengaged from a vacuum operated diaphragm in order to turn on the vehicle lights. Once the automobile is started, the vacuum motor assembly compresses and engages the shaft to maintain the lights in an on position. Upon turning the automobile engine off, the diaphragm expands and pulls the shaft to the off position.

Conversely, U.S. Pat. No. 3,206,637, Finken, discloses a system whereby parking lights are prohibited from being operated while the vehicle is moving. The parking light circuit is connected to the transmission selector lever so that the parking lights may not operate when the lever is in a drive position. U.S. Pat. Nos. 3,021,449, Kerr et al, 3,058,030, Simpkins and 2,045,274, Kundig are examples of headlight switching devices not considered especially relevant to the present invention.

SUMMARY OF THE INVENTION

In the present invention, there is a standard automobile headlight and accessory light switch apparatus having an "on" position and an "off" position, the light switch apparatus having a plurality of first male mating connections thereon. The apparatus further comprises a wiring harness having a plurality of female mating connections thereon interfitting with the male mating connections of the light switch apparatus, with each of the female mating connections being supplied with electrical current from an electrical wire connected thereto.

The apparatus of the present invention comprises an adapter apparatus having male and female mating connections adapted to interfit between the light switch apparatus and the wiring harness. A normally open pressure sensitive switch apparatus is provided which is adapted to be connected to the adapter apparatus and closed when the automobile engine is turned on. A manually operable override switch device may be provided which is connected to the adapter apparatus in order to bypass the pressure sensitive switch apparatus.

The adapter apparatus is provided with a first primary circuit terminal adapted to interfit with the female connections of the wiring harness providing electricity to headlights and selected other lights. The first primary circuit terminal is further connected to the pressure sensitive switch apparatus and the male mating connection of the light switch apparatus thereby creating a first light circuit controlled by the pressure sensitive switch device. A second light circuit is created by connecting the primary circuit terminal to the manually operable override switch device.

The pressure sensitive switch apparatus may be connected to a vacuum line on the automobile engine such that when the engine is turned on the pressure sensitive switch apparatus is evacuated and biased toward the closed position. When the engine is turned off, the pressure sensitive switch device returns to the open or "off" position thereby turning off the lights. The pressure sensitive switch device may also be provided as an oil pressure activated switch means connected to a pressurized motor oil line on the engine, being operable when the engine is turned on.

BRIEF DESCRIPTION OF THE DRAWINGS

FIG. 1 is an isometric view illustrating an exploded view of the present invention in place in an automobile light switch apparatus;

FIG. 2 is an isometric view illustrating a portion of the switch device of the present invention;

FIG. 3 is an isometric view of a second embodiment of the pressure sensitive switch device of the present invention;

DESCRIPTION OF THE PREFERRED EMBODIMENT

Figure 4:
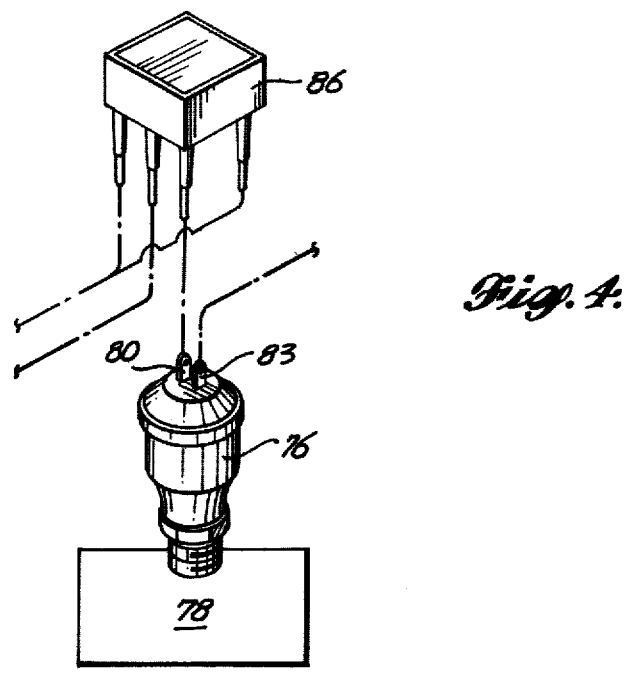
FIG. 4 is an isometric view of a third embodiment of the pressure sensitive switch device of the present invention.
Figure 5:
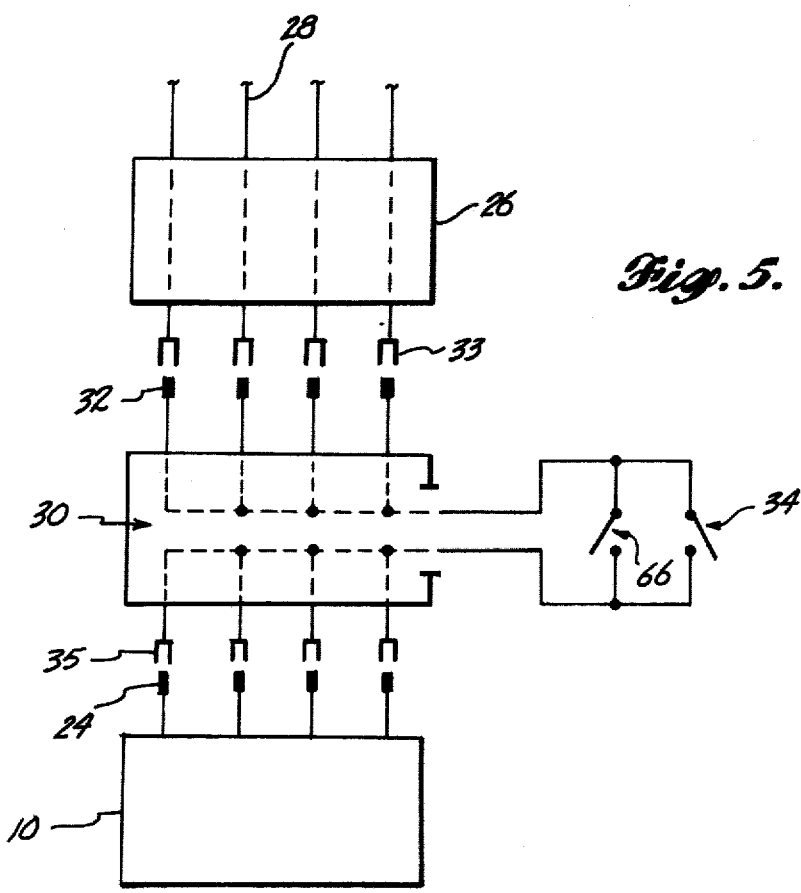
FIG. 5 is an electrical diagram of the present invention.

As shown in FIG. 1, there is an automobile headlight and accessory light switch apparatus 10 having a manually operable handle element 20 having at least two positions. Depending upon the lights operated by the handle element 20, such handles typically have an "off" position, a "parking light" and a "headlight" position. Other lights, such as trunk lights, map lights, or door lights may be operable by the switch apparatus when in either of the "parking light" or "headlight" position. The headlight switch apparatus comprises a behind-thedash housing portion 22 having a plurality of first mating connections 24 therein. As shown in FIG. 1, these first mating connections 24 are provided as male connections which interfit with female connections in a wiring harness 26. The wiring harness 26 is provided with electrical wires 28 which carry electrical currents to the headlights or accessory lights controlled by the switch apparatus. Although not shown herein, it is to be understood that a battery and generator (or alternator) is provided with the vehicle to generate the electrical current necessary to illuminate the headlights or accessory lights.

The present invention comprises an adapter apparatus 30 which is adapted to interfit between the headlight switch apparatus 10 and the wiring harness 26. The adapter apparatus 30 is provided with a plurality of second mating connections 32 which correspond to the first mating connections 24 of the headlight switch apparatus 10, and which are adapted to interfit with the female mating connections 33 of the wiring harness 26. The adapter apparatus 30 is further provided with female mating connections 35 corresponding to the female mating connections 33 of the wiring harness 26. Therefore, the adapter apparatus 30 will interfit with the male first mating connection 24 of the headlight switch apparatus 10 and the female mating connections 33 of the wiring harness 26 such that electricity is transferred from the wiring harness 26 to the headlight switch apparatus 10 through the adapter apparatus 30.

Each of the first mating connections 24 and related electrical wires 28 controls the electrical current flowing to the headlights or other accessory lights, as operated through the handle element 20 of the headlight switch 10. The present invention directs the electrical current which operates the headlights and parking lights from the wiring harness 26 through a pressure sensitive switch device 34 to the headlight switch apparatus 10. In so doing, the headlights and parking lights are operable in a primary circuit only partially controlled by the headlight switch apparatus 10. The pressure sensitive switch device 34 is a normally open switch, such that even when the handle element 20 is in the "on" position with the automobile engine turned off, the electrical circuit to the switch apparatus 10 will not be closed and therefore the headlights and parking lights will not operate. When the switch 34 is closed as the engine is turned on, the headlights and parking lights may be operated by pulling the handle element 20 to the "on" position.

A first embodiment of the switch device 34 of the present invention comprises an airtight housing 36 having attachment points 38 thereon, and a vacuum-operated switch device 40 therein. The airtight housing 36 is evacuated by attaching a vacuum line 42 thereto, the vacuum line 42 being interconnected with any one of a number of vacuum lines associated with an automobile engine. The vacuum line 42 is provided with a check valve 44, and the housing 36 is provided with a bleeder valve 46.

The vacuum operated switch device is provided with a pair of contact points 48 and 50, with one of the contact points 50 being adapted such that with the evacuation of the housing 36, the moveable contact point 50 will be urged into contact with the other contact point 48, thereby closing the circuit to the adapter apparatus 30. Because the vacuum line 42 is interconnected with the vacuum line on the engine, a vacuum will be applied to the housing 36 only upon starting the engine, and during the period of its operation. Therefore, the circuit to the headlights and parking lights may only be closed, and therefore they may only be operable during, that period when the engine is running. Upon turning the engine off, the check valve 44 will maintain the vacuum within the housing 36, thereby keeping the headlights and parking lights on after the engine is turned off (assuming that the handle element 20 is in the "on" position). The bleeder valve 46 may be adjusted so that the vacuum will be released from the housing 36 over a period of seconds or minutes desired by the owner, such that while the lights will remain on after the engine is turned off, they will go out soon thereafter.

The adapter apparatus 30 is provided with a primary circuit terminal 52 as shown in FIG. 2 which reroutes the electrical current from the wiring harness through the switch device 34 and back to the headlight switch apparatus 10. The primary circuit terminal 52 comprises a mating connection 54 which interfits with the appropriate female mating connection on the wiring harness 26, as well as a pair of circuit terminals 56 and 58, one of the circuit terminals 56 conducting electrical current to the switch device 34 and the other circuit terminal 58 returning electrical current from the switch device to the adapter apparatus 30. The circuit terminals 54 and 56 may advantageously be provided as a single unit which is connected to the terminal 58, as by glueing, but separated therefrom by an insulation member 59, so that current may not flow directly from terminals 54 and 56 to terminal 58 without first going through switch device 40. The vacuum operated switch device 40 is provided with electrical terminals 60 which conduct current to and from the switch device 40. Suitable female connections 62 and 64 interfit with the male circuit terminals 56 and 58.

The present invention is provided with a manually operable override switch 66, a normally open switch which may be closed by, for instance, depressing a button 68, thereby permitting the headlights and parking lights to function, even with the engine turned off, if the handle element 20 is in the "on" position. The override switch 66 is interconnected with the circuit terminals 56 and 58 to provide a secondary circuit which may override the primary circuit through the pressure sensitive switch device 34.

In vehicles manufactured prior to 1973, various accessory lights were routed through the fuse box, with the headlights and parking lights having a circuit breaker built within the headlight switch apparatus 10. Vehicles manufactured after 1973 are generally provided with circuit breakers or fuses for all of the headlights and other accessory lights built within the headlight switch apparatus 10. Therefore, if the present invention is to be retrofitted on an automobile manufactured prior to 1973, provisions must be made to provide a fuse element for the accessory lights previously routed through the fuse box (such as tail lights, stop lights and dashboard lights). Therefore, an in-line fuse element 70 is provided to interfit with the adapter apparatus 30. As shown in FIG. 1, the headlight switch apparatus 10 is provided with a mating connection 72 which is adapted to interfit with a corresponding female connection on the wiring harness 26, with the electrical wire connected thereto also connecting the accessory lights with the fuse box. The adapter apparatus 30 is not provided with a male mating connection corresponding to the mating connection 72 on the headlight switch apparatus 10, therefore the electrical current from the wiring harness is not transferred directly through the adapter apparatus 30 to the headlight switch apparatus 10. Since this accessory light circuit is routed through the pressure sensitive switch device 34, a fuse element 70 must be provided to replace the fuse no longer utilized from the fuse box. Current entering the adapter apparatus 30 from the wiring harness 26 is directed through a male mating connection 74 to the fuse element 70, with the circuit being completed by interfitting with the female connection 64. In this manner, the tail lights, stop lights and dashboard lights will be energized only when the circuit is completed through the pressure sensitive switch device 34 or the manually operable override switch 66 and the fuse element 70 will function rather than a fuse from the fuse box.

While it may be most convenient to utilize the present invention with a vacuum operated pressure sensitive switch device 34, a second embodiment may utilize a pressure sensitive switch device which is operable by the oil pressure generated by the engine. As illustrated in FIG. 3, there is an oil pressure switch apparatus 76 which is operatively connected to the engine 78 or an oil pressure line associated with the engine. The oil pressure switch apparatus 76 comprises a pair of contact points 80 and 82 which are normally open, these points being urged to a closed position when the engine is turned on. A third contact 83 turns an oil pressure indicator light on the dashboard on and off responsive to the engine 78. Oil under pressure is directed into the switch apparatus 76 which closes contact points 80 and 82, and, after the engine is turned off, a spring loaded check valve 84 functions as a bleeder device to retain the oil pressure within the switch apparatus 76 for a short period of time thereafter. Therefore, with the handle element in the "on" position, the lights will not operate unless the engine is running. Upon turning on the engine, a slight time delay is built into the switch apparatus 76 until the oil pressure closes the contact points 80 and 82 thereby illuminating the headlights and parking lights. Upon turning off the engine, with the handle element 20 in the "on" position, the lights will remain on until the oil pressure is bled from the check valve 84 a sufficient amount to reopen the contact points 80 and 82, thereby opening the circuit and turning off the lights. As in the previous embodiment, a manually operable override switch may be included to operate the lights when the engine is turned off.

As shown in FIG. 4, a time delay relay apparatus 86 may be included with the oil pressure switch apparatus 76 which will operate to maintain the headlights and/or parking lights illuminated when the handle element 20 is in the "on" position when the engine is turned off. In this embodiment, the oil pressure switch apparatus 76 functions as a ground to complete the desired circuit between the adapter apparatus 30 and the headlight switch apparatus 10 through the time delay relay apparatus 86. The time delay relay apparatus 86 comprises a heating element with contact points which are normally open, but which are closed by the heating element, thereby permitting current to flow through the contacts within the apparatus 86 when the engine is turned on. As oil pressure builds up in the switch apparatus 76, the contact points 80 and 82 within apparatus 76 are closed and grounded, thereby completing the circuit between the adapter apparatus 30 and the switch apparatus 10. The heating element within the time delay relay apparatus 86 is energized, which closes contacts within apparatus 86, completing the circuit and permitting the headlights to function. When the engine is turned off, with the handle element 20 in the "on" position, the headlights will remain on for a short period of time. As the oil pressure drops within the switch apparatus 76, the contact points therein are opened, removing the ground and preventing the flow of current to the relay heater within apparatus 86. The contact points within the relay apparatus 86 are opened only after the heat has been dissipated from the heating element. Therefore, a delay of from 10 to 60 seconds is experienced from the time the engine is turned off until the circuit is completely opened and the headlights are automatically turned off.

What is claimed is:

1. An automatic headlight switching system adapted to be mounted to an automotive vehicle which has as existing equipment the following
    (a) a manually operable headlight switch having an "on" position and an "off" position,
    (b) first mating electrical contact means connected to said headlight switch,
    (c) a wiring harness having second mating electrical contact means connected to automobile headlights and adapted to engage the first mating electrical contact means so as to establish contact between the headlight switch and the headlights,
    (d) an engine having a pressure source that provides first pressure level with said engine operating and a second pressure level with said engine not operating, said automatic headlight switching system comprising:
    (a) an adapter adapted to be positioned between said wiring harness and said first mating electrical contact means, said adapter having a third mating electrical contact means adapted to interfit with said first mating electrical contact means and fourth electrical mating contact means adapted to interfit with said second mating electrical contact means,
    (b) a pressure responsive switch means electrically connected between said third and fourth electrical contact means, said pressure responsive switch means adapted to be connected to and be responsive to said pressure source in said automotive vehicle, in a manner that said first pressure level causes said pressure responsive switch means to close, and said second pressure level causes said pressure responsive switch means to open,
    (c) an over-ride switch means connected in parallel with said pressure responsive switch means between said third and fourth mating electrical contact means,
    (d) a manually controlled over-ride operating member to move said over-ride switch between its open and closed positions, whereby when said vehicle has its engine running to create said first pressure level at said pressure source, the pressure sensitive switch means is caused to close to enable the headlights to be turned on by the headlight switch, and when said engine is not running, said pressure responsive switch means is permitted to open and shut-off said headlights, with the manual over-ride switch being able to be operated to turn the headlights on even when the engine is not running.

2. The system as recited in claim 1, wherein said adapter comprises a housing adapted to be positioned between said wiring harness and said first mating electrical contact means, said third mating electrical contact means comprising a first set of electrical contacts adapted to interfit with mating contacts of said first mating electrical contact means, said fourth mating electrical contact means comprising a second set of electrical contacts positioned oppositely with respect to said first set and adapted to engage a set of electrical contact means of said second mating electrical contacts means.

3. The system as recited in claim 2, wherein said first and second set of contacts have secondary contacts connected thereto and adapted to engage electrical contacts connected to said pressure responsive switch means.

4. The system as recited in claim 3, wherein each contact of the first set is connected through an insulating member to a corresponding contact of the second set whereby the first and second set of contacts are insulated from one another and yet are properly positioned for proper mating engagement with the contacts of the first and second mating electrical contact means.

5. The system as recited in claim 1, wherein said pressure responsive switch means comprises an airtight housing defining a vacuum chamber containing a switch element having a normally opened position, said switch element being responsive to a partial vacuum in said chamber to move said pressure responsive switch to its closed position, said airtight housing having a bleed member to permit controlled dissipation of a vacuum in said airtight housing.

* * * * *